(12) United States Patent
Nishi

(10) Patent No.: US 10,703,432 B2
(45) Date of Patent: Jul. 7, 2020

(54) THROTTLE OPENING DETECTING APPARATUS FOR SADDLE RIDING VEHICLE

(71) Applicant: HONDA MOTOR CO., LTD., Minato-ku, Tokyo (JP)

(72) Inventor: Atsushi Nishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/282,530

(22) Filed: Feb. 22, 2019

(65) Prior Publication Data
US 2019/0283834 A1 Sep. 19, 2019

(30) Foreign Application Priority Data
Mar. 13, 2018 (JP) .................................. 2018-045267

(51) Int. Cl.
 *B62K 23/02* (2006.01)
 *B62K 23/04* (2006.01)
 *B62J 23/00* (2006.01)

(52) U.S. Cl.
 CPC .............. *B62K 23/04* (2013.01); *B62J 23/00* (2013.01); *F02D 2200/0404* (2013.01)

(58) Field of Classification Search
 CPC .... B62K 23/02; B62K 23/04; B62K 2202/00; B62J 23/00; B62J 2099/002; F02D 11/107; F02D 2200/0404
 See application file for complete search history.

(56) References Cited

U.S. PATENT DOCUMENTS

| 6,377,016 | B1 * | 4/2002 | Strong .................. B62K 23/02 |
| | | | 318/139 |
| 6,631,656 | B2 * | 10/2003 | Ase .......................... B62J 6/16 |
| | | | 74/551.8 |
| 9,745,014 | B2 * | 8/2017 | Osanai .................. B60K 23/02 |
| 9,896,149 | B2 * | 2/2018 | Watanabe ................ H01H 3/02 |
| 10,377,441 | B2 * | 8/2019 | Oshiro .................... F02B 61/02 |
| 2013/0240285 | A1 | 9/2013 | Yagi et al. |

(Continued)

FOREIGN PATENT DOCUMENTS

| DE | 102013205035 A1 | 10/2013 |
| JP | H11-344302 | 12/1999 |
| JP | 2008-035593 | 2/2008 |

(Continued)

OTHER PUBLICATIONS

Machine translation of JP 2017-133449 A obtained on Dec. 20, 2019.*

(Continued)

*Primary Examiner* — Adam D Rogers
(74) *Attorney, Agent, or Firm* — Rankin, Hill & Clark LLP

(57) ABSTRACT

In a throttle opening detecting apparatus for a saddle riding vehicle which includes a handle cover, a handle switch group, and a handlebar, and in which a throttle opening sensor fixed to the handlebar and configured to detect a displacement of a rotor in a sensor case is included in the handle cover, at least one switch of the handle switch group is disposed at a position facing the sensor case in the handle cover, and the sensor case has a step portion formed on a side surface thereof on a side opposite to a throttle pipe rotated integrally with the rotor.

9 Claims, 7 Drawing Sheets

(56) References Cited

U.S. PATENT DOCUMENTS

2017/0327172 A1  11/2017  Osanai et al.

FOREIGN PATENT DOCUMENTS

| JP | 2009-151025 | 7/2009 |
| JP | 2013-204675 | 10/2013 |
| JP | 2017-133449 A | 8/2017 |
| WO | 2014/054355 | 4/2014 |

OTHER PUBLICATIONS

European Search Report dated Sep. 3, 2019, 7 pages.
Japanese Office Action dated Jun. 25, 2019, English translation included, 7 pages.
Indian Office Action with English text included dated Dec. 28, 2019, 6 pages.

* cited by examiner

THROTTLE OPENING DETECTING APPARATUS FOR SADDLE RIDING VEHICLE

CROSS-REFERENCE TO RELATED APPLICATION

The present application claims priority under 35 U.S.C. § 119 to Japanese Patent Application No. 2018-045267 filed on Mar. 13, 2018, the entire contents of which are hereby incorporated by reference.

BACKGROUND OF THE INVENTION

Field of the Invention

The present invention relates to a throttle opening detecting apparatus for a saddle riding vehicle.

Description of the Related Art

In a motorcycle, an opening sensor is used for detecting a throttle opening. The opening sensor is mounted to a handlebar and detects a displacement by rotation of a rotor fixed to a throttle pipe.

As disclosed in Japanese Patent Laid-open No. 2017-133449, a switch group is mounted to the handlebar together with the opening sensor.

A handlebar has an opening sensor configured integrally with a throttle pipe mounted thereto and a switch group mounted thereto. Accordingly, the switch group is disposed with respect to the throttle pipe with the opening sensor interposed therebetween.

In order for an operator of the motorcycle to operate the switch group while driving, it is necessary that the switch group be appropriately disposed in a range in which a finger of the operator can reach in a state in which the operator grasps the throttle grip.

Further, in a motorcycle having such a design as to cover a handlebar with a cowl or the like, it is demanded to configure a switch group as well as an opening sensor in a compact manner.

It is also demanded to make the opening sensor hardly affected by an external force such as a magnetic force.

The present invention has been made in view of the foregoing circumstances, and it is an object of the present invention to provide a throttle opening detecting apparatus for a saddle riding vehicle in which a throttle opening sensor and a switch group attached to a handlebar are configured in a compact manner and the opening sensor is hardly affected by an external force such as a magnetic force.

SUMMARY OF THE INVENTION

According to an embodiment of the present invention, there is provided a throttle opening detecting apparatus for a saddle riding vehicle which includes a handle cover (1), a handle switch group (61, 62, 63), and a handlebar (2), and in which a throttle opening sensor (4) fixed to the handlebar (2) and detecting a displacement of a rotor (43) inside a sensor case (41) is included in the handle cover (1). In the throttle opening detecting apparatus, at least one switch of the handle switch group (61, 62, 63) is disposed at a position facing the sensor case (41) in the handle cover (1), and the sensor case (41) has a step portion (41a) formed on a side surface thereof on a side opposite to a throttle pipe (5) rotated integrally with the rotor (43).

Further, in the invention described above, the step portion (41a) may be disposed behind the throttle pipe (5).

Further, in the invention described above, the step portion (41a) may be formed in an arcuate shape.

Further, in the invention described above, a set plate (7) holding the handlebar (2) may be connected to the sensor case (41), the set plate (7) may include two divided parts divided in a front-rear direction, that is, a front half body (71) and a rear half body (72), the set plate (7) may have at a center thereof halved tubular portions (71c, 72c) between which the handlebar (2) is fitted, and at opposite ends of the halved tubular portions (71c, 72c) plate portions (71a, 71b) to be connected to the sensor case (41), and the plate portions (71a, 71b) may be disposed offset from each other in the front-rear direction with the handlebar (2) interposed therebetween.

Further, in the invention described above, at least some switches of the handle switch group (61, 62, 63) may be disposed on an opposite side, with respect to the handlebar (2), to a side of the offset of the plate portions (71a, 71b).

Further, in the invention described above, at least one of connectors (61a, 62a, 63a) of the handle switch group (61, 62, 63) may overlap the plate portion (71b) as viewed from a front side.

Further, in the invention described above, the plate portion (71b) of the set plate (7) may be offset forward, and at least one of connectors (61a, 62a, 63a) of the handle switch group (61, 62, 63) may be disposed behind the plate portion (71b).

Further, in the invention described above, members (46, 44) detecting a displacement of the rotor (43) of the throttle opening sensor (4) may be disposed on an opposite side to the step portion (41a) with the handlebar (2) interposed therebetween.

Further, in the invention described above, the members (46, 44) detecting a displacement of the rotor (43) may be disposed in front of the handlebar (2).

Effects of the Invention

According to an embodiment of the present invention, a throttle opening detecting apparatus for a saddle riding vehicle includes a handle cover, a handle switch group, and a handlebar, and in which a throttle opening sensor fixed to the handlebar and detecting a displacement of a rotor in a sensor case is included in the handle cover, at least one switch of the handle switch group is disposed at a position facing the sensor case in the handle cover, and the sensor case has a step portion formed on a side surface thereof on a side opposite to a throttle pipe rotated integrally with the rotor.

With this configuration, even in a limited space inside the handle cover, the step portion enables appropriate disposing of the switches, and the sensor case within a range within which operability for a rider is secured.

Further, in the invention described above, the step portion may be disposed behind the throttle pipe.

With this configuration, the switches are disposed on the side of the operator, and the step portion is formed on the reverse side of the switches, thereby allowing a clearance for moving the switches on assembling or removing the switches to be generated.

Further, in the invention described above, the step portion may be formed in an arcuate shape.

With this configuration, a clearance for the multiple switches can be generated.

Further, in the invention described above, a set plate holding the handlebar may be connected to the sensor case, the set plate may include two divided parts divided in a front-rear direction, that is, a front half body and a rear half body, the set plate may have at a center thereof halved tubular portions between which the handlebar is fitted in, and at opposite ends of the halved tubular portions plate portions to be connected to the sensor case, and the plate portions may be disposed offset from each other in the front-rear direction with the handlebar interposed therebetween.

With this configuration, even in a limited space inside the handle cover, the switches and the throttle opening sensor can be appropriately disposed within a range within which operability for the rider is secured.

Further, in the invention described above, at least some switches of the handle switch group may be disposed on an opposite side, with respect to the handlebar, to a side of the offset of the plate portions.

With this configuration, in the proximity of the sensor case, a space for accommodating other components can be appropriately secured.

Further, in the invention described above, at least one of connectors of the handle switch group may overlap the plate portion as viewed from a front side.

With this configuration, space-saving arrangement of the connectors can be achieved.

Further, in the invention described above, the plate portion of the set plate may be offset forward, and at least one of connectors of the handle switch group may be disposed behind the plate portion.

With this configuration, terminals to be connected to the connectors can be disposed in a space generated by offsetting the plate. Therefore, even in a limited space inside the handle cover, it is easy to secure a space for connecting terminals.

Further, in the invention described above, members detecting a displacement of the rotor of the throttle opening sensor may be disposed on an opposite side to the step portion with the handlebar interposed therebetween.

With this configuration, even in a limited space inside the handle cover, the switches and the throttle opening sensor can be appropriately disposed within a range within which operability for the rider is secured.

Further, in the invention described above, the throttle opening sensor may be disposed in front of the handlebar.

The throttle opening sensor can be disposed between the brake lever and the handlebar so as to keep a distance from the outside, and thus, the throttle opening sensor is hardly affected by an external force.

DETAILED DESCRIPTION OF THE PREFERRED EMBODIMENT

An embodiment of the present invention will be described below with reference to the accompanying drawings.

First Embodiment

Figure 1:
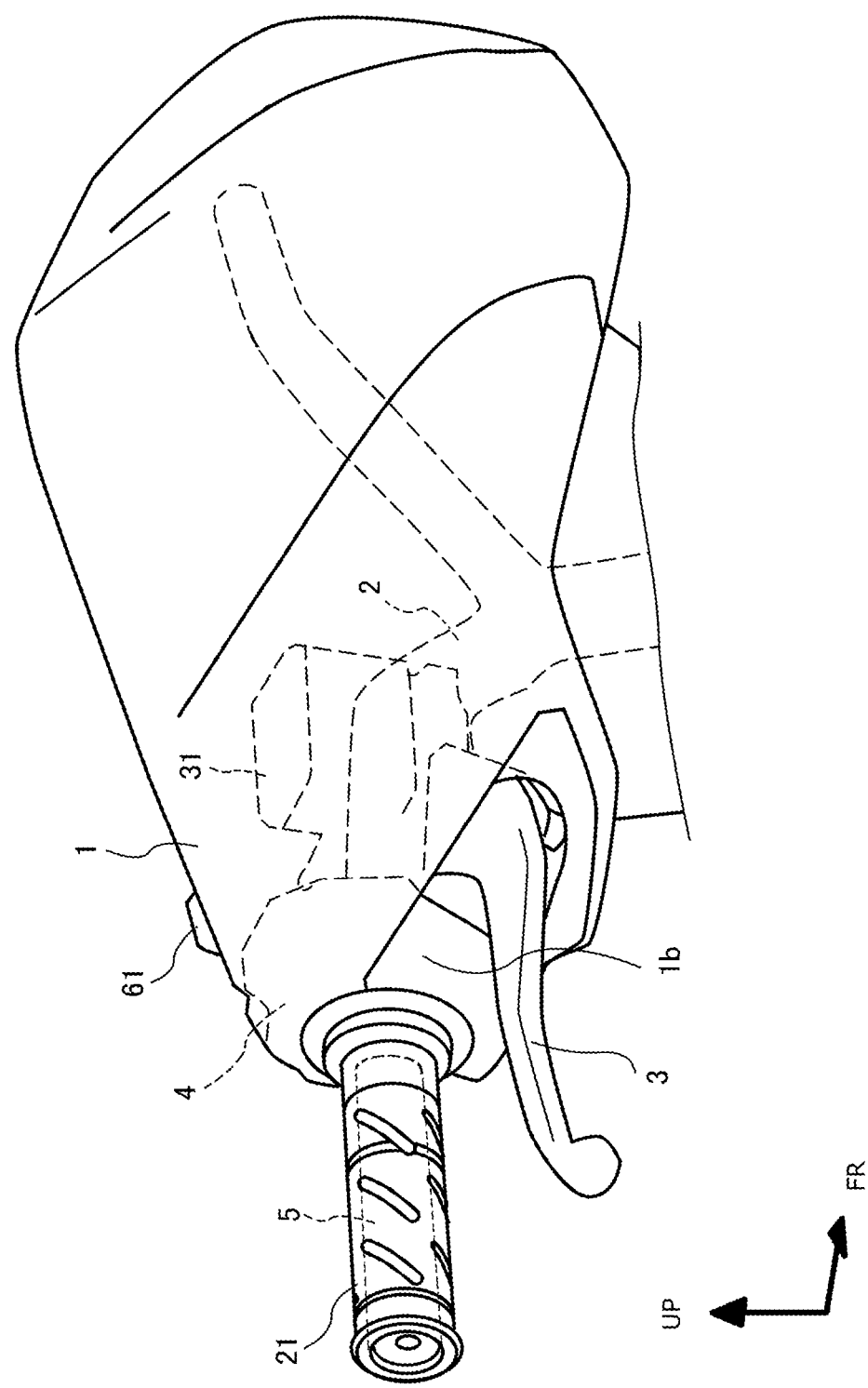
FIG. 1 is a perspective view depicting a configuration of the vicinity of a handlebar of a motorcycle according to an embodiment of the present invention.

FIG. 1 is a perspective view depicting a configuration of the vicinity of a handlebar of a motorcycle according to an embodiment of the present invention. In the drawings, symbol FR indicates the front direction of a vehicle body, symbol UP indicates the upward direction of the vehicle body, and symbol RH indicates the rightward direction of the vehicle body.

A handlebar 2 of the motorcycle is covered with a handle cover 1. On a right end portion of the handlebar 2, a throttle pipe 5 is mounted together with a throttle opening sensor 4. The throttle pipe 5 has a grip 21 mounted on an outer peripheral surface thereof.

A brake lever 3 is disposed in front of the grip 21 and mounted to the handlebar 2 together with a master cylinder 31.

The throttle opening sensor 4 and the master cylinder 31 are arranged inside the handle cover 1, and a front portion of the throttle opening sensor 4 is covered with a sensor portion cover 1b.

This prevents devices disposed inside the handle cover 1 from being exposed to rainwater and dust. Further, the handle cover 1 allows air to flow smoothly in the vicinity of the handlebar 2.

Figure 2:
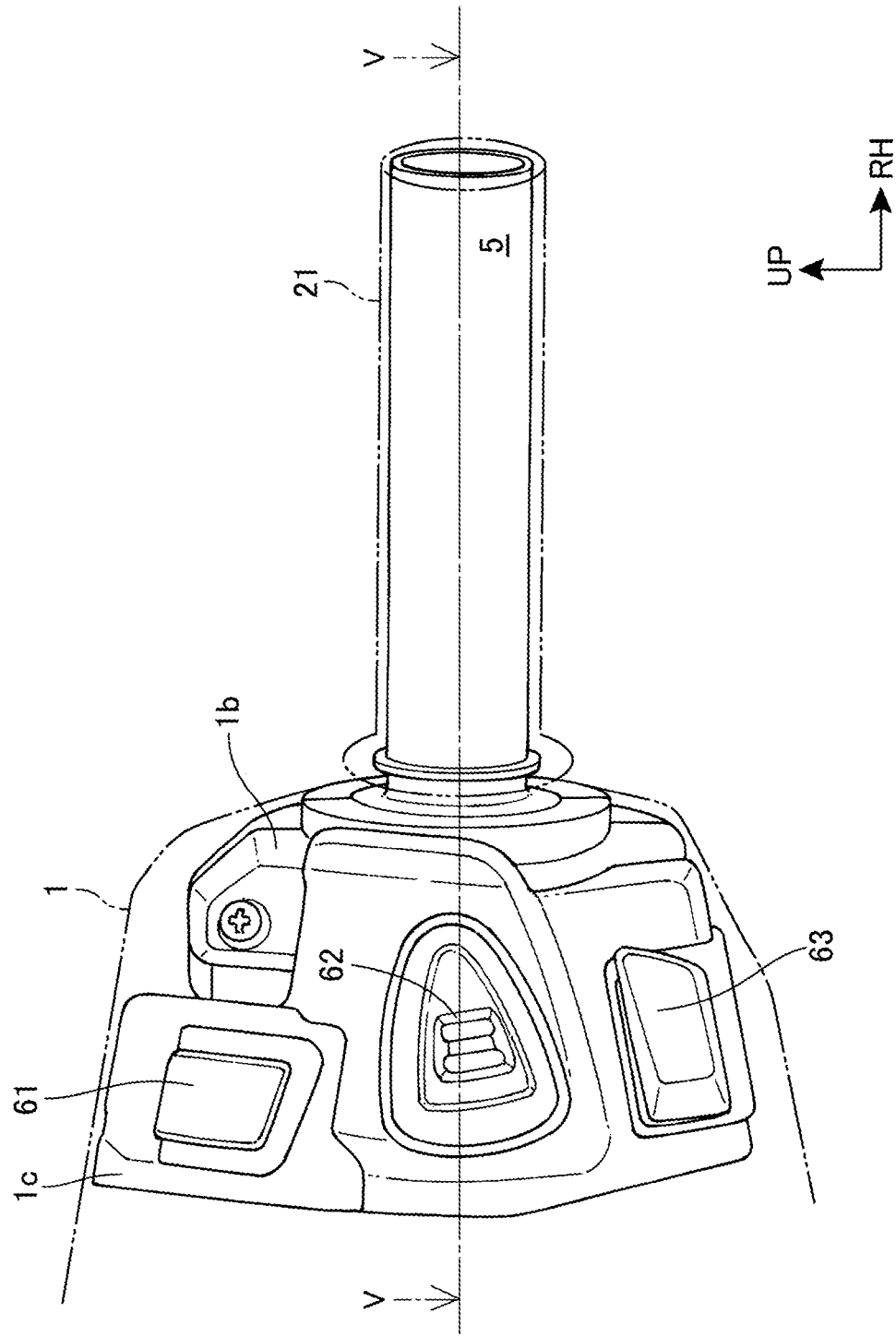
FIG. 2 is a view depicting a configuration of the vicinity of a throttle pipe as viewed from the rear side.
Figure 3:
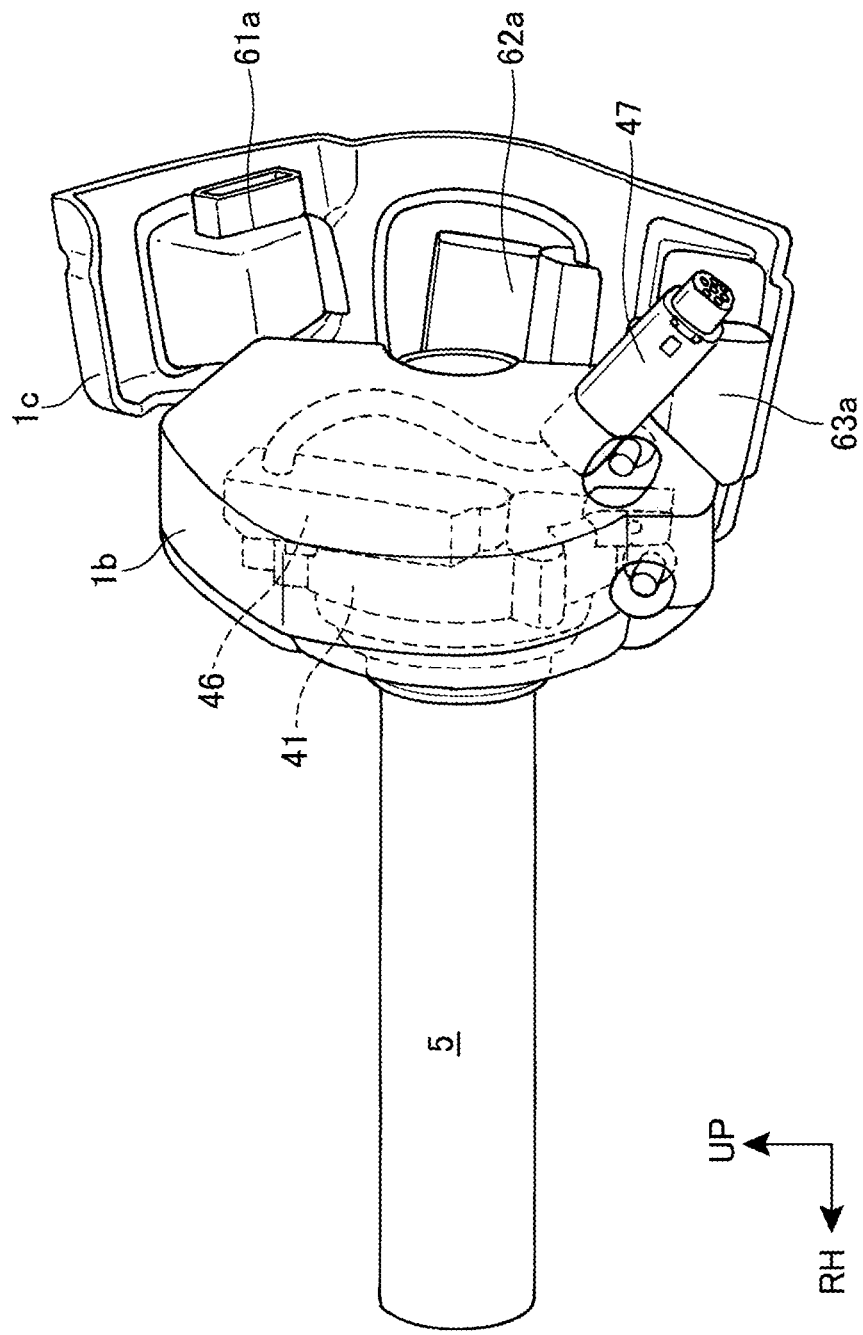
FIG. 3 is a perspective view depicting the configuration of the vicinity of the throttle pipe as viewed from the front side.
Figure 4:
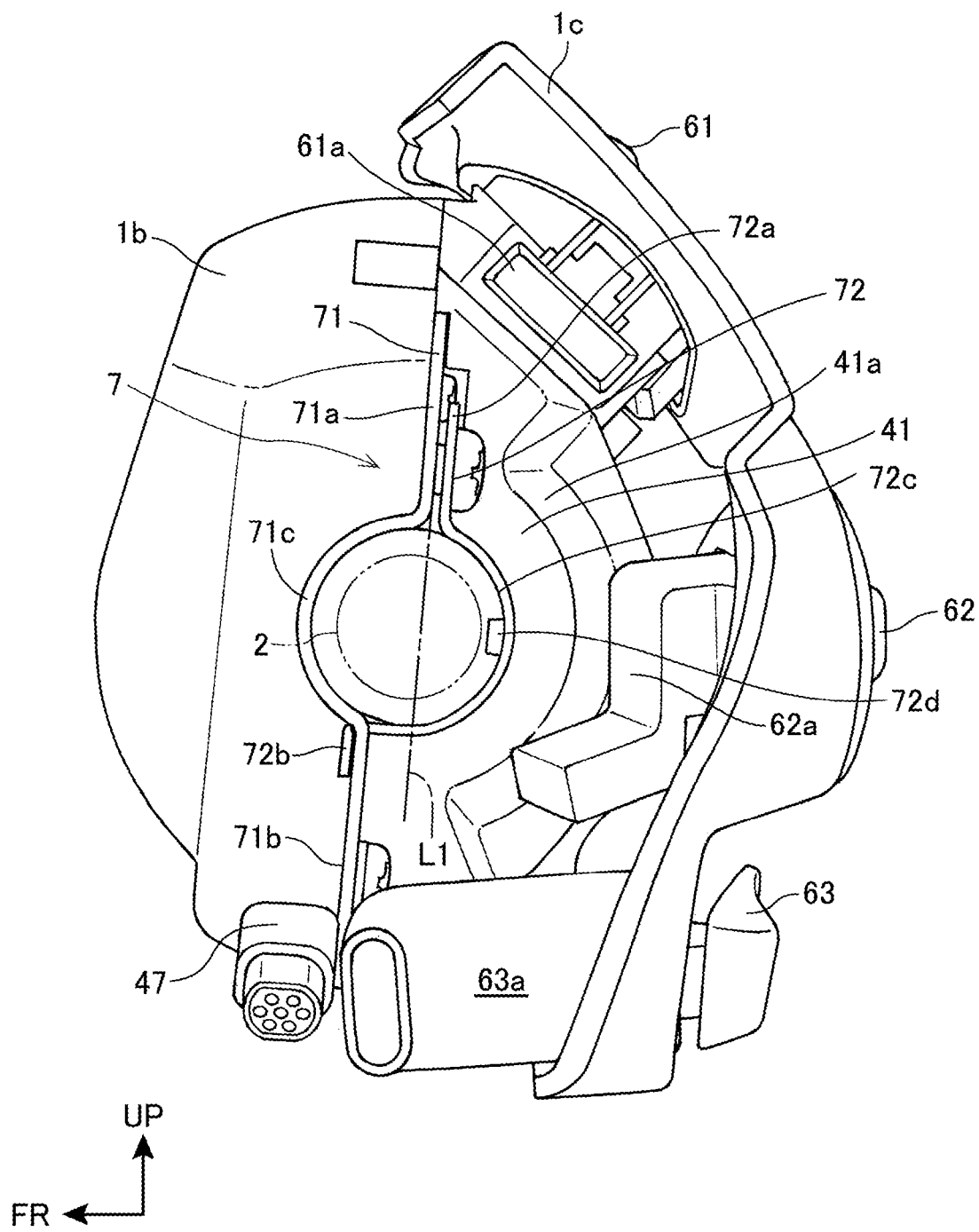
FIG. 4 is a left side view depicting a mounting structure of a throttle opening sensor.
Figure 5:
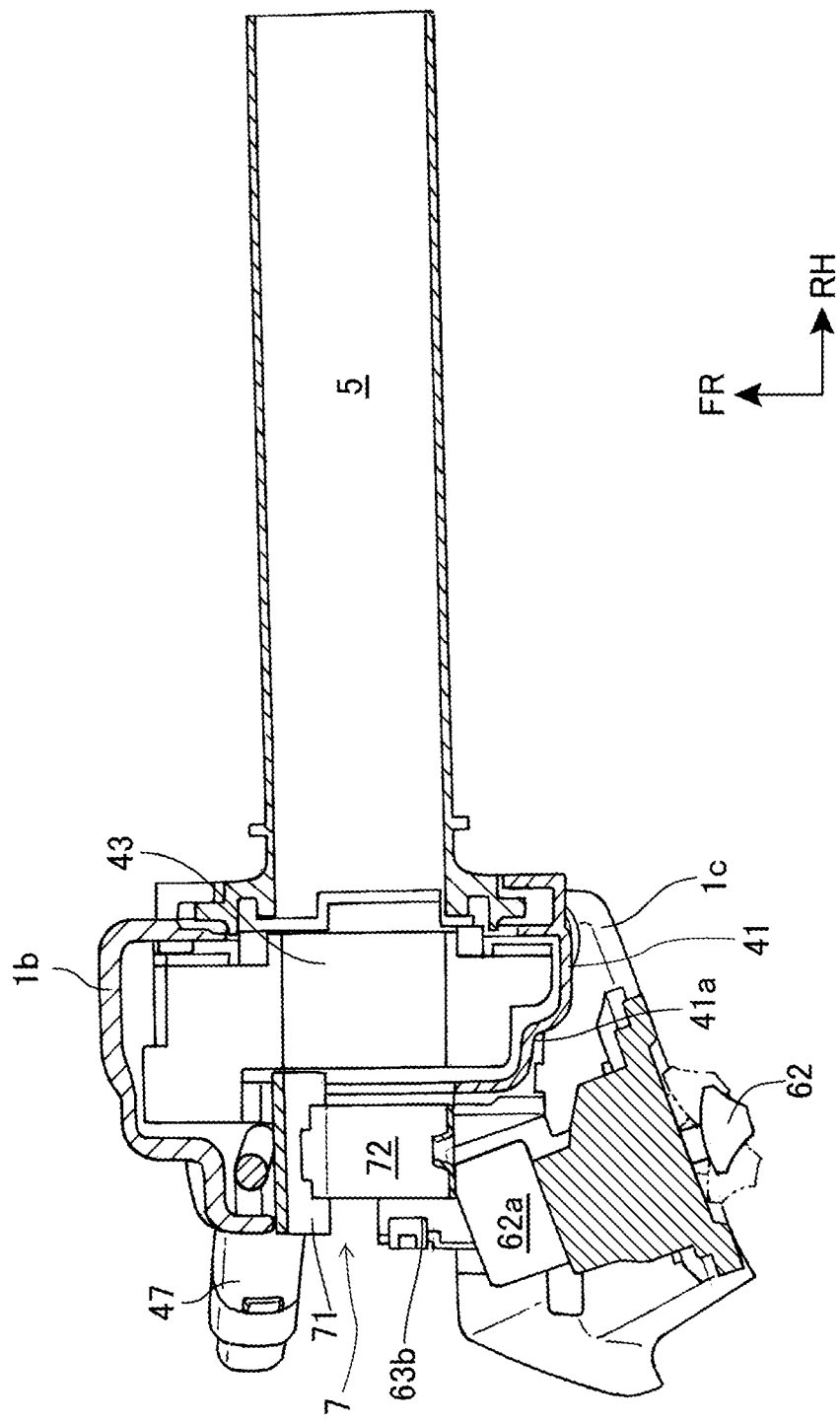
FIG. 5 is a cross-sectional view taken along line V-V in FIG. 2.

FIG. 2 is a view depicting the configuration of the vicinity of the throttle pipe as viewed from the rear side, and FIG. 3 is a perspective view depicting the configuration of the vicinity of the throttle pipe as viewed from the front side. FIG. 4 is a left side view depicting a mounting structure of the throttle opening sensor, and FIG. 5 is a cross-sectional view taken along line V-V in FIG. 2.

The handle cover 1 includes at a right end portion thereof a switch cover 1c in which a handle switch group of the motorcycle is arranged. The handle switch group includes a first switch 61, a second switch 62, and a start switch 63.

The first switch 61 is a switch that can be used as a dimmer switch, a kill switch, or the like. The second switch 62 is a switch that can be used as a light switch, position switch, or a hazard-warning-light switch.

It should be noted that the start switch 63 is used on starting an engine.

The throttle opening sensor 4 is disposed inside the handle cover 1 and in front of the switch cover 1c. The switch cover 1c covers a rear surface of the throttle opening sensor 4 ranging from an upper portion to a lower portion of the throttle opening sensor 4.

As depicted in FIG. 5, the switch cover 1c is disposed such that a rear surface of the switch cover 1c is slightly oriented to the right side. This causes the switch group arranged in the switch cover 1c to be disposed closely to the wrist of the right hand of an operator, enabling the operator to easily operate the switch group with his/her thumb.

The throttle pipe 5 is mounted to the throttle opening sensor 4 which can detect a rotation amount of the throttle pipe 5.

As depicted in FIG. 3, a front side and a left side surface portion of the throttle opening sensor 4 are covered with the sensor portion cover 1b, and a connector 47 of the throttle opening sensor 4 protrudes from a lower portion of a left side surface of the sensor portion cover 1b toward a left and obliquely lower side. A control unit (not depicted) of the motorcycle is connected to the connector 47 via a cable and recognizes the rotation amount of the throttle pipe 5.

The first switch 61, the second switch 62, and the start switch 63 are disposed behind the throttle opening sensor 4, and the second switch 62 is disposed at a position facing the throttle opening sensor 4 in a front-rear direction. A sensor case 41 of the throttle opening sensor 4 has a step portion 41a formed at a left rear portion thereof.

The sensor case 41 has a rear portion formed in a cylindrical shape centered at the handlebar 2, with an outer peripheral surface of the rear portion on an outer side in a vehicle width direction larger than the outer peripheral surface on an inner side. This makes the step portion 41a in an arcuate shape in the rear portion of the sensor case 41.

It should be noted that, since the sensor case 41 has the step portion 41a in the rear portion thereof, the step portion 41a is disposed outside the throttle pipe 5 with respect to the handlebar 2 as a center. Accordingly, the step portion 41a is positioned behind the throttle pipe 5.

Further, operating portions for the first switch 61, the second switch 62, and the start switch 63 are disposed outside the throttle opening sensor 4 with respect to the handlebar 2 as a center. The operating portions for the first switch 61, the second switch 62, and the start switch 63 are exposed from the switch cover 1c. Accordingly, the switch group can be operated externally of the handle cover 1.

Connectors 61a and 62a of the first switch 61 and the second switch 62 respectively protrude from the switch cover 1c toward the handlebar 2. A connector 63a of the start switch 63 extends rearward. It should be noted that, in FIG. 5, a connector 63b is the connector 63a with its cover removed.

The throttle opening sensor 4 is mounted to the handlebar 2 by a set plate 7.

Figure 6:
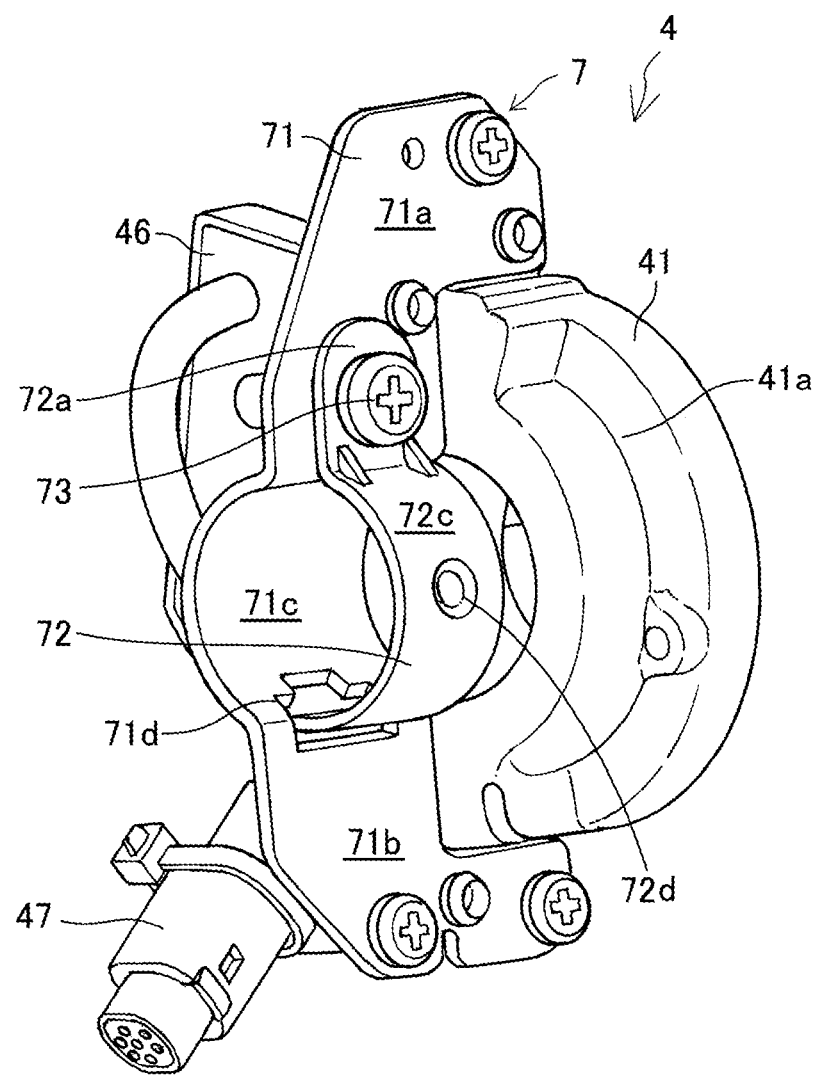
FIG. 6 is a perspective view depicting the throttle opening sensor and a set plate.
Figure 7:
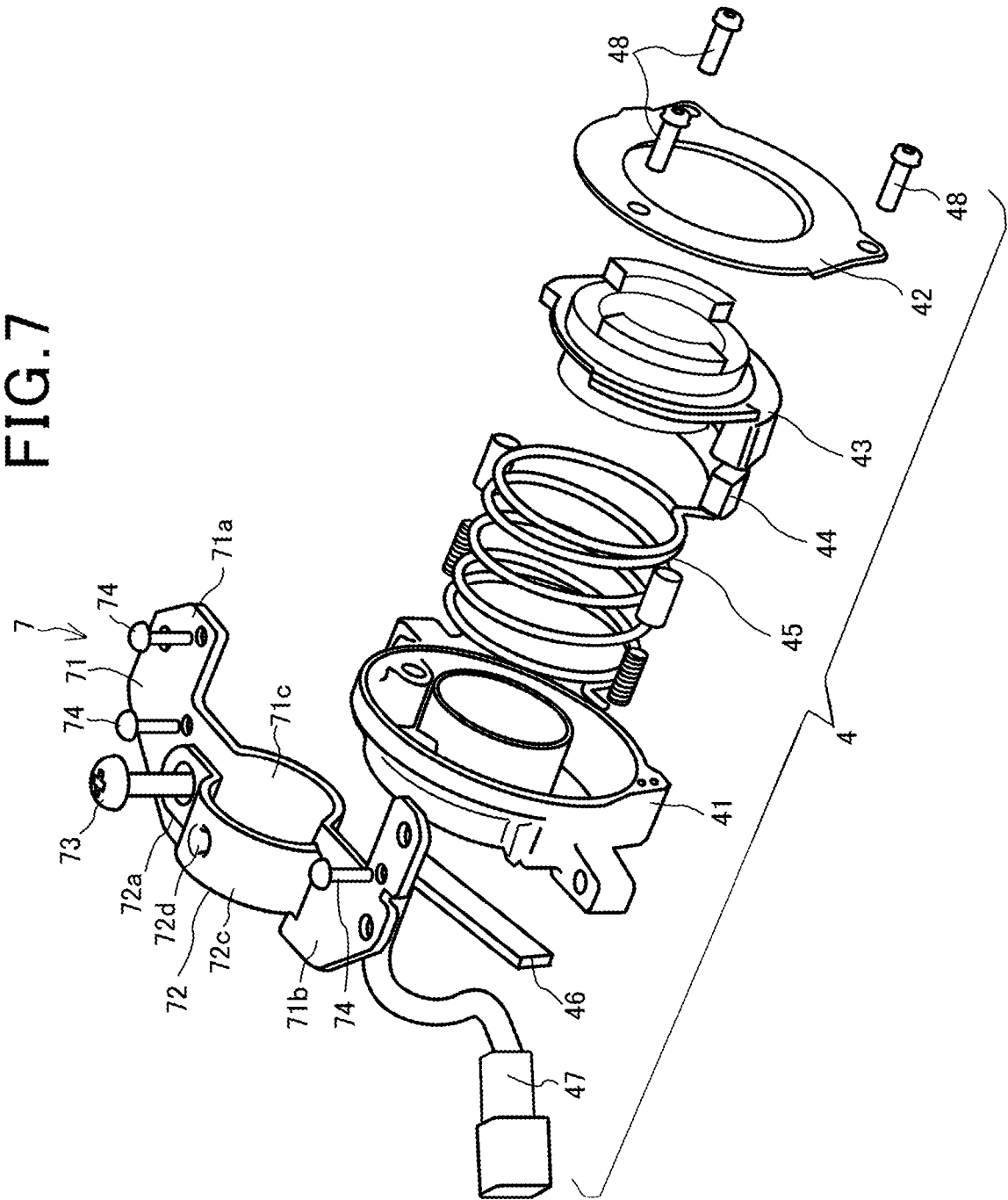
FIG. 7 is an exploded view of the throttle opening sensor.

FIG. 6 is a perspective view depicting the throttle opening sensor and the set plate, and FIG. 7 is an exploded view of the throttle opening sensor.

The set plate 7 includes a front plate 71 as a front half body of the set plate 7 and a rear plate 72 as a rear half body of the set plate 7. The front plate 71 of the set plate 7 has an upper portion 71a and a lower portion 71b both fixed to the sensor case 41 by screws 74.

As depicted in FIG. 4 and FIG. 6, the rear plate 72 is mounted to the front plate 71. The rear plate 72 has a lower portion 72b inserted into an opening portion 71d of the front plate 71, and an upper portion 72a fixed to the upper portion 71a of the front plate 71 by a screw 73.

An arcuate portion 71c, which serves as a halved tubular portion of the set plate 7, is provided between the upper portion 71a and the lower portion 71b which are plate portions of the front plate 71. Further, an arcuate portion 72c, which serves as another halved tubular portion of the set plate 7, is provided between the upper portion 72a and the lower portion 72b which are plate portions of the rear plate 72.

The handlebar 2 can therefore be disposed between the arcuate portions 71c and 72c disposed at respective central portions of the front plate 71 and the rear plate 72, whereby the handlebar 2 is held by the set plate 7.

It should be noted that the arcuate portion 72c of the rear plate 72 has a protrusion 72d formed therein. By inserting the protrusion 72d in a positioning hole (not depicted) of the handlebar 2, the throttle opening sensor 4 can be mounted at a predetermined position of the handlebar 2.

The upper portion 71a of the front plate 71 is offset with respect to the lower portion 71b in the front-rear direction. As depicted in FIG. 4, in a state in which the set plate 7 is mounted to the handlebar 2, the front plate 71 makes the upper portion 71a offset rearward and the lower portion 71b offset forward. That is, the lower portion 71b is positioned in front of a straight line L1 along the upper portion 71a in a side view.

In a lower portion of the switch cover 1c, the connector 62a of the second switch 62 extends forward, extends downward and then further extends forward. This avoids interference between the connector 62a and the arcuate portion 72c of the rear plate 72.

In a lower portion of the switch cover 1c, the connector 63a of the start switch 63 extends forward and reaches to a position below the arcuate portion 72c of the rear plate 72.

The connector 63a is disposed at a position overlapping the handlebar 2 as viewed from above, and disposed at a position overlapping the lower portion 71b of the front plate 71 as viewed from the front side. That is, the connector 63a is disposed utilizing a space generated by offsetting the lower portion 71b of the front plate 71 forward.

As depicted in FIG. 7, a rotor 43, a magnet 44 and a return spring 45 are arranged inside the sensor case 41 of the throttle opening sensor 4, and a cover 42 is mounted to the sensor case 41 and fixed by screws 48.

The rotor 43 is engaged with the throttle pipe 5 and rotated integrally with the throttle pipe 5. The magnet 44 is mounted to the rotor 43. The return spring 45 is engaged with a side of the rotor 43 opposite to the side engaged with the throttle pipe 5. The return spring 45 biases the rotor 43 in a direction of closing the throttle pipe 5, i.e. clockwise as viewed from the left side.

A circuit board 46 is attached to a left side surface on the front side of the sensor case 41. The circuit board 46 is in a vertically-long plate shape and has a surface attached to the sensor case 41, the surface being parallel to a surface on which a circuit is formed.

The connector 47 is connected to the circuit board 46 via a cable. Specifically, a cable for connecting to the connector 47 is attached to an upper portion of the circuit board 46 and is vertically routed from an upper portion to a lower portion of the throttle opening sensor 4. This allows the cable connecting the connector 47 and the circuit board 46 to be made long in the throttle opening sensor 4, thereby allowing curves of the cable to be gentle.

In the throttle opening sensor 4, the circuit board 46 and the magnet 44 mounted to the rotor 43 configure a detector that detects a displacement of the rotor 43. The magnet 44 is formed in an arcuate shape along the handlebar 2 and disposed in a front portion of the sensor case 41.

By disposing the circuit board 46 and the magnet 44 in the front portion of the sensor case 41, the step portion 41a recessed inward is formed in a rear portion of the sensor case 41 opposite to the front portion.

Now, operations according to the embodiment of the present invention will be described below.

As depicted in FIG. 7, the magnet 44 of the rotor 43 and the circuit board 46 are disposed on the front side in the throttle opening sensor 4 in the front-rear direction of the motorcycle. The magnet 44 is in an arcuate shape having the central angle of approximately 90 degrees or less, and the opening of a throttle pipe of a motorcycle is generally 90 degrees or less. Accordingly, by disposing the magnet 44 on the front side, even when the throttle pipe 5 is rotated, the magnet 44 remains on the front side of the sensor case 41. The space required behind the rotor 43 is thus reduced.

Further, by mounting the circuit board 46 on the front side of the sensor case 41 along with the magnet 44, the rear portion of the sensor case 41 can be reduced in size.

Since the step portion 41*a* is disposed in the rear portion of the sensor case 41, the switch group can be disposed closely to the rear portion of the sensor case 41 without influencing the mechanism and actions of the throttle opening sensor 4. Further, by bringing the second switch 62 close to the step portion 41*a* when the second switch 62 is assembled to the switch cover 1*c*, the range within which the second switch 62 can be moved is increased.

In addition, forming the step portion 41*a* in the rear portion of the sensor case 41 enhances the rigidity of the rear portion of the sensor case 41.

Since the set plate 7 for mounting the sensor case 41 to the handlebar 2 is configured by the front plate 71 and the rear plate 72, the set plate 7 can be easily formed by press-molding a metal plate.

Further, compared with a case in which a plastic material is used, the thickness of the set plate 7 can be made thin, and a space occupied by the set plate 7 in a space in the vicinity of the throttle opening sensor 4 can be reduced.

In the front plate 71 of the set plate 7, the upper portion 71*a* and the lower portion 71*b* are offset from each other in the front-rear direction. This increases a space in front of the upper portion 71*a* and a space behind the lower portion 71*b*. In a space inside the handle cover 1, a large space can be secured in which the switch group is disposed behind the lower portion 71*b*.

As described above, according to the embodiment to which the present invention is applied, in the throttle opening detecting apparatus for a saddle riding vehicle which includes the handle cover 1, the first switch 61, the second switch 62, and the start switch 63, and the handlebar 2 and in which the throttle opening sensor 4 fixed to the handlebar 2 and detecting a displacement of the rotor 43 inside the sensor case 41 is included in the handle cover 1, at least one of the first switch 61, the second switch 62, and the start switch 63 can be disposed at a position facing the sensor case 41 inside the handle cover 1, and the sensor case 41 can have the step portion 41*a* formed on a side surface thereof on a side opposite to the throttle pipe 5 rotated integrally with the rotor 43.

With this configuration, the throttle opening sensor 4 can be configured in a compact manner, and therefore, the switch group and the throttle opening sensor 4 can be appropriately arranged even in the handle cover 1.

Further, the step portion 41*a* can be disposed behind the throttle pipe 5.

With this configuration, the switch group and the throttle opening sensor 4 can be appropriately arranged even in the handle cover 1. In addition, the switch group can be disposed closely to the throttle opening sensor 4, enabling the operator to easily operate the switch group. Further, the step portion 41*a* enhances the rigidity of a circumferential surface of the sensor case 41, which leads to reduction in thickness of the rear portion of the sensor case 41. As a result, the rear portion of the sensor case 41 can be further configured in a compact manner.

Further, the step portion 41*a* can be formed in an arcuate shape.

With this configuration, the sensor case 41 can be made compact so as to match the circular shape of the rotor 43. In addition, a space for arranging the switch group in the vertical direction behind the sensor case 41 can be secured.

Further, the set plate 7 holding the handlebar 2 may be connected to the sensor case 41, and the set plate 7 may be configured by two divided parts, which are divided in the front-rear direction, that is, the front plate 71 and the rear plate 72. The set plate 7 may have at the center thereof the arcuate portions 71*c* and 72*c* between which the handlebar 2 is fitted in, and at opposite ends of the arcuate portions 71*c* and 72*c* the upper portion 71*a* and the lower portion 71*b* of the front plate 71 to be connected to the sensor case 41. The upper portion 71*a* and the lower portion 71*b* may be disposed offset from each other in the front-rear direction with the handlebar 2 interposed therebetween.

With this configuration, even in the handle cover 1, the throttle opening sensor 4 including the set plate 7 and the switch group can be configured in a compact manner.

Further, at least some of the first switch 61, the second switch 62, and the start switch 63 may be disposed on an opposite side, with respect to the handlebar 2, to the side of the offset of the upper portion 71*a* and the lower portion 71*b* of the front plate 71.

With this configuration, even in the handle cover 1, the switch group can be appropriately disposed.

Further, at least one of the connectors 61*a*, 62*a*, and 63*a* of the first switch 61, the second switch 62, and the start switch 63 may overlap the lower portion 71*b* of the front plate 71 as viewed from the front side.

With this configuration, interference between the connectors of the switch group and the set plate 7 can be avoided, the space for disposing the switch group can be secured, and mounting work can be facilitated.

Further, the lower portion 71*b* of the front plate 71 of the set plate 7 may be offset forward, and at least one of the connectors 61*a*, 62*a*, and 63*a* of the first switch 61, the second switch 62, and the start switch 63 may be disposed behind the lower portion 71*b*.

With this configuration, interference between the connectors of the switch group and the set plate 7 can be avoided, the space for disposing the switch group can be secured, and mounting work can be facilitated.

Further, the circuit board 46 and the magnet 44 which are members for detecting a displacement of the rotor 43 of the throttle opening sensor 4 may be disposed on an opposite side to the step portion 41*a* with respect to the handlebar 2.

With this configuration, in the proximity of the throttle opening sensor 4, a space for disposing the switch group on the side of the step portion 41*a* can be secured, and the switch group can be disposed closely to the throttle opening sensor 4.

This allows the switch group to be brought close to the throttle pipe 5, so that the switch group can be easily operated while at the same time operating the throttle pipe 5.

Further, the circuit board 46 and the magnet 44 which are members for detecting a displacement of the rotor 43 may be disposed in front of the handlebar 2.

With this configuration, the circuit board 46 and the magnet 44 which are members for detecting a displacement of the rotor 43 are disposed between the handlebar 2 and the brake lever 3, and thus, the circuit board 46 and the magnet 44 are hardly affected by an external force.

The embodiment described above merely represents one aspect of the present invention, and modifications and applications may be arbitrarily made without departing from the spirit the present invention.

While the embodiment has been described citing a motorcycle as an example of saddle riding vehicles, the present invention is not limited thereto. The present invention is applicable to any types of saddle riding vehicles including three-wheel saddle riding vehicles having two front or rear wheels and saddle riding vehicles having four or more wheels.

DESCRIPTION OF REFERENCE SYMBOLS

1 Handle cover
2 Handlebar
3 Brake lever
4 Throttle opening sensor
5 Throttle pipe
7 Set plate
41 Sensor case
41a Step portion
42 Cover
43 Rotor
44 Magnet
45 Return spring
46 Circuit board
47 Connector
61 First switch
61a Connector
62 Second switch
62a Connector
63 Start switch
63a Connector
71 Front plate
71a Upper portion
71b Lower portion
71c Arcuate portion
71d Opening portion
72 Rear plate
72a Upper portion
72b Lower portion
72c Arcuate portion
72d Protrusion

What is claimed is:

1. A throttle opening detecting apparatus for a saddle riding vehicle comprising a handle cover, a handle switch group, and a handlebar, the throttle opening detecting apparatus further comprising:
a throttle opening sensor fixed to the handlebar and detecting a displacement of a rotor in a sensor case is included in the handle cover, wherein
at least one switch of the handle switch group is disposed at a position facing the sensor case in the handle cover,
the sensor case has a step portion formed on a side surface thereof on a side opposite to a throttle pipe rotated integrally with the rotor, and
the step portion is formed in an arcuate shape.

2. The throttle opening detecting apparatus for a saddle riding vehicle according to claim 1, wherein the step portion is disposed behind the throttle pipe.

3. The throttle opening detecting apparatus for a saddle riding vehicle according to claim 1,
wherein a set plate holding the handlebar is connected to the sensor case,
the set plate includes two divided parts divided in a front-rear direction, that is, a front half body and a rear half body,
the set plate has at a center thereof halved tubular portions between which the handlebar is fitted in, and at opposite ends of the halved tubular portions plate portions to be connected to the sensor case, and
the plate portions are disposed offset from each other in the front-rear direction with the handlebar interposed therebetween.

4. The throttle opening detecting apparatus for a saddle riding vehicle according to claim 3, wherein a plurality of switches of the handle switch group are disposed on an opposite side, with respect to the handlebar, to a side of the offset of the plate portions.

5. The throttle opening detecting apparatus for a saddle riding vehicle according to claim 4, wherein at least one of a plurality of connectors of the handle switch group overlaps one of the plate portions as viewed from a front side.

6. The throttle opening detecting apparatus for a saddle riding vehicle according to claim 3, wherein one of the plate portions of the set plate that overlaps with at least one of a plurality of connectors of the handle switch group as viewed from a front side is offset forward, and at least one of the plurality of connectors of the handle switch group is disposed behind the one of the plate portions.

7. The throttle opening detecting apparatus for a saddle riding vehicle according to claim 1,
wherein the rotor is engaged with one end of the throttle pipe in which the handlebar is inserted and the rotor is rotated integrally with the throttle pipe,
at a rear portion of the sensor case in which the rotor is stored, the step portion that is recessed toward the rotor is formed on the side surface thereof on the side opposite to the throttle pipe,
at least one switch of the handle switch group is disposed at a position facing the step portion and relatively closer to the throttle pipe than other switches of the handle switch group.

8. A throttle opening detecting apparatus for a saddle riding vehicle comprising a handle cover, a handle switch group, and a handlebar, the throttle opening detecting apparatus further comprising:
a throttle opening sensor fixed to the handlebar and detecting a displacement of a rotor in a sensor case is included in the handle cover,
at least one switch of the handle switch group is disposed at a position facing the sensor case in the handle cover, and
the sensor case has a step portion formed on a side surface thereof on a side opposite to a throttle pipe rotated integrally with the rotor,
wherein a magnet and a circuit board of the throttle opening sensor that detect the displacement of the rotor are disposed on an opposite side to the step portion with the handlebar interposed therebetween.

9. The throttle opening detecting apparatus for a saddle riding vehicle according to claim 8, wherein the magnet and the circuit board of the throttle opening sensor that detect the displacement of the rotor are disposed in front of the handlebar.

* * * * *